Patented Aug. 17, 1943

2,327,116

UNITED STATES PATENT OFFICE 2,327,116

POLYAMIDES

Donald J. Loder, Wilmington, Del., assignor to E. I. du Pont de Nemours & Company, Wilmington, Del., a corporation of Delaware No Drawing. Application October 1, 1941, Serial No. 413,238

10 Claims. (Cl. 260—78)

This invention relates to polymeric materials and more particularly to polyamides.

The polymeric materials with which this invention is concerned are the high molecular weight synthetic linear polyamides described in U. S. Patents 2,071,250, 2,071,253 and 2,130,948. Generally speaking, these polyamides comprise the reaction product of a linear polymer-forming composition, i. e. one consisting essentially of bifunctional reacting material, said composition comprising in substantial amount molecules containing two amide-forming groups each of which is complementary to an amide-forming group in other molecules in said composition.

These polyamides can be cold drawn (i. e. drawn under tension in the solid state) with high and permanent linear extension, and textile fibers showing by X-ray examination molecular orientation along the fiber axis, are thereby obtained. These polyamides as described above or as otherwise identified hereinafter can be obtained, for example, by self-polymerization of a monoaminomonocarboxylic acid, or by reacting a diamine with a dibasic carboxylic acid in substantially equimolecular amounts.

The inclusion of an acetal group in one of the reactants provides a method for chemical modification of the polyamide. This result can be accomplished without undue difficulty in the case of the aromatic acetals, for example, by reacting a diamine with an aromatic dibasic acid in which the acetal group (—O—CH₂—O—) is linked to two aromatic residues as in the compound HOOCC₆H₄OCH₂OC₆H₄COOH. This procedure, however, is not applicable in the case of a similar compound containing an aliphatically linked acetal group because these compounds are readily hydrolyzed by water containing traces of acids. Thus, if the dibasic acid contains an aliphatic acetal group, the compound is immediately hydrolyzed by the water of condensation resulting from the polyamide-forming reaction between the terminal carboxyl groups of the acid and the amino groups of the diamine. The same result takes place if the aliphatic acetal group is part of the chain separating the amino groups of the diamine, or of the chain separating the amino and carboxyl groups in the self-polymerizable amino acids.

This invention has as an object new and useful polyamides. A further object is the preparation of polyamides chemically modified in a manner which enhances for some purposes the utility of the polyamide products. A further object is a method for preparing polyamides containing an aliphatically linked acetal group. Other objects will appear hereinafter.

The above objects are accomplished through the preparation of polyamides from a linear polymer-forming composition containing a reactant having two amide-forming groups separated by a chain of atoms containing an aliphatically linked acetal group, by a method which consists in using compositions which on condensing to form the polyamides do not hydrolyze the polymeric reaction products formed. To this end the amide-forming groups in the polymer-forming reactants are selected such that the by-product formed on reaction is a non-hydrolytic agent, for example, an alcohol or a phenol. More specifically the new polyamides described herein are obtained by heating to reaction temperature a polymer-forming composition in which the bifunctional reacting material contains as the complementary amide-forming groups only amino and ester groups, and in which at least one of these reactants contains an aliphatically attached acetal group as an integral part of the chain of atoms separating the mentioned amide-forming groups. The reaction is continued until the polymer can be formed into fibers, this stage usually being reached when the polymer has an intrinsic viscosity, as defined in U. S. Patent 2,130,948, of at least 0.4.

The acetals from which the above polyamides are prepared can be obtained by reacting formaldehyde or a substituted formaldehyde with an amino alcohol or with an ester of an aliphatic hydroxy acid. Thus a dibasic acid ester containing the acetal group is obtained by reacting two molecules of an ester of a monohydroxymonocarboxylic acid with one molecule of an aldehyde. The ester thus formed has the general formula:

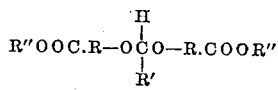

A specific example of a dibasic acid ester of this kind is diisobutyl hydroxyacetate formal,

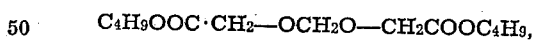

which could also be referred to as diisobutyl glycolyl formal.

Diamines containing an aliphatic acetal group can be obtained by reacting one mol of an aldehyde with two mols of an amino alcohol. The diamines have the formula:

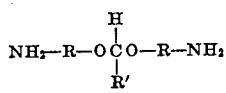

An example of this type of diamine is $$NH_2-CH_2CH_2OCH_2OCH_2CH_2-NH_2.$$

The acetal-containing diamines can also be prepared by a three-step process involving (a) reaction of acetals with cyanhydrins, (b) hydrogenation of the reaction products, and (c) conversion of the resultant amines to salts and disproportionation of the latter to diamines. The first step of this synthesis is effected by mixing the acetal, e. g. methylal, and the cyanhydrin, e. g. formaldehyde cyanhydrin, in the presence of an acidic catalyst, e. g., sulfuric acid, and heating the mixture for several hours, e. g. at about 100° C. The product, $CH_3OCH_2OCH_2CN$ in the case of the above mentioned reactants, is separated from the reaction mixture by distillation and is then hydrogenated to the corresponding amine, $CH_3OCH_2OCH_2CH_2NH_2$, in the second step of the synthesis. The hydrogenation is preferably effected in the liquid phase in the presence of 1 to 20 mols of ammonia per mol of nitrile and in the presence of a hydrogenation catalyst, e. g. nickel, cobalt, fused copper cobalt or copper chromate. The preferred conditions are 75° to 150° C. and 200 to 700 atmospheres pressure. In the third step of the reaction the amine is treated with an acid, e. g. hydrochloric, sulfuric, phosphoric, acetic, glycolic or oxalic, to form the salt. This reaction, which is generally carried out between 0 and 100° C. is followed by treatment of the salt with a suitable base, such as an alkali metal or alkaline earth metal hydroxide carbonate, or alkoxide, or an organic base such as pyridine. The diamine containing the acetal group is then separated by distillation. The reactions involved in the third step of the synthesis are illustrated below for the specific reactant mentioned above:

(a) $CH_3OCH_2OCH_2CH_2NH_2 + HCl \rightarrow$
$CH_3OCH_2OCH_2CH_2NH_2 \cdot HCl$ (b) $2CH_3OCH_2OCH_2CH_2NH_2 \cdot HCl \rightarrow$
$CH_3OCH_2OCH_3 + HCl \cdot H_2NCH_2CH_2$
$OCH_2OCH_2CH_2NH_2 \cdot HCl$ (I)

(c) $I + 2NaOH \rightarrow$
$H_2NCH_2CH_2OCH_2OCH_2CH_2NH_2 + 2NaCl$

In making the polyamide the above acetal-containing dibasic acid ester is reacted with a substantially equimolecular amount of a diamine of the usual type, as for example, one of the formula $NH_2-(CH_2)_n-NH_2$, or the diamine containing the acetal group is reacted with a substantially equimolecular amount of a dibasic carboxylic acid ester of the usual type, for example one of the formula $R''OOC(CH_2)_nCOOR''$. Or a diamine and dibasic acid ester each containing an acetal group as represented by the above general formula can be reacted to form the polyamide.

Amino acid esters containing an acetal group in the chain between the amino and ester groups have the formula:

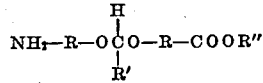

An example of an amino acid of this kind is $$NH_2-CH_2CH_2OCH_2OCH_2COOC_2H_5$$

The amino acid ester is converted into polyamide by heating at amide-forming temperatures.

The above reactants containing the acetal groups are expressed by the general formula

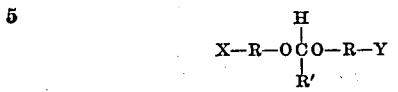

in which X and Y are the same or dissimilar functional amide-forming groups such as carbalkoxy and amino, or amine alone, or carbalkoxy alone.

General formulae for the recurring structural unit in the simpler types of polyamides of this invention are presented below.

A. From diamine containing acetal group and dibasic acid

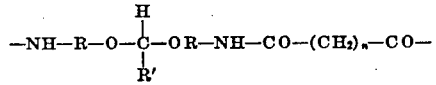

B. From dibasic ester containing acetal group and diamine

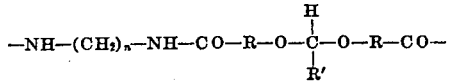

C. From amino acid ester containing acetal group

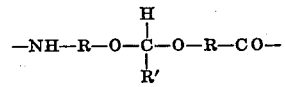

In the several formulae given above R represents a divalent hydrocarbon radical in which the carbon atom united to the acetal group is aliphatic, i. e., is joined to other atoms by single bonds only, R' is hydrogen or a monovalent hydrocarbon radical, R'' is a monovalent hydrocarbon radical, and $n$ is an integer preferably above 2. It should be understood that these formulae represent the simpler types. More complex types are those in which the $(CH_2)n$ groups are replaced by branched chains, closed chains, or chains containing hetero atoms, or in which a mixture of reactants is used to form an interpolymer.

In the preferred practice of the invention in which the acetals are made with formaldehyde, the group $CHR_1$ is $CH_2$.

In preparing the polyamides the usual procedure comprises a preliminary heating of the polyamide-forming composition, with or without a solvent such as ethanol, in a pressure vessel at a temperature between 125° and 300° C., preferably at from 150°–175° C., for a period of 1 to 3 hours, and a subsequent heating at a slightly elevated temperature under normal atmospheric pressure for a period of ½ to ¾ hour, in such a manner as to permit any solvent previously added or product formed by the reaction to escape. A final heating cycle of one to three hours at reduced pressure at the usual polyamide-forming temperatures in the range of 200°–250° C. and preferably 200°–220° C. is employed. These reactions are carried out preferably in the absence of air and if any pressure is desired it is preferred to use an inert atmosphere such as nitrogen.

The following examples are illustrative of methods for practicing the invention.

*Example I*

Equimolecular amounts of decamethylenediamine (4073 parts) and diisobutyl hydroxyacetate formal (6530 parts) were heated in a sealed tube for 2 hours at 202° C. under nitrogen. The tube was then heated at 218° C. under 2 mm. absolute pressure for 2 hours. The polyamide thus formed melted at 150°–155° C. and had an intrinsic viscosity of 0.46. Films pressed from the material and cold drawn 200% had a tensile strength of 17,300 lbs./sq. in.

*Example II*

Two hundred eighty six parts of hexamethylenediamine and 680.2 parts of diisobutyl hydroxyacetate formal and 500 parts of phenol were placed in a pressure reaction vessel and heated at 182° C. for 1 hour at atmospheric pressure and then at 202° C. for 1 hour at atmospheric pressure. The vessel was attached to the vacuum pump and the heating was continued at 202° C. for 1 hour. Finally, the vessel was heated for 4 hours at 202° C. under 3 mm. pressure (absolute). The melting point of the polymer was 155°–157° C. and its intrinsic viscosity 0.65.

*Example III*

Three thousand four hundred and eighty seven parts of decamethylenediamine, 5564 parts of the diurethane of diaminodiethyl formal $(H_5C_2OOC-NH-CH_2-CH_2-O-$
$\qquad CH_2-O-CH_2-CH_2-NH-COOC_2H_5)$ and 8000 parts of phenol were placed in a pressure reaction vessel and heated as follows: ½ hour at 182° C. under atmospheric pressure; for ½ hour at 202° C. under atmospheric pressure; 1 hour at 218° C. under atmospheric pressure; 1 hour at 218° C. under 10 mm. absolute pressure; and finally for 2 hours at 218° C. under 3 mm. absolute pressure. The melting point of the polymer so prepared was 150°–152° C. and its intrinsic viscosity 0.70. From this polymer a film was cast and cold rolled to 190%–200%. A film 0.26" in width and 0.0027" in thickness showed a tensile of 14,200 lbs./sq. in. Another film of 0.24" in width and 0.0025" in thickness showed 18,200 lbs./sq. in. tensile.

*Example IV*

Seven thousand three hundred and seventy six parts of hexamethylenediamine, 8823.3 parts of diisobutyl hydroxyacetate formal, 9410.2 parts of diphenyl adipate, and 20,000 parts of phenol were heated in a pressure reaction vessel as follows: For 2 hours at 155° C. under atmospheric pressure; for 2 hours at 181° C. under atmospheric pressure; for 2 hours at 218° C. under atmospheric pressure; for 1 hour at 218° C. under 22 mm. pressure; and finally for 2 hours at 218° C. under 2 mm. pressure. The polyamide thus formed was hard, tough, opaque, and slightly brown. It had an intrinsic viscosity of 0.62 and was easily spun into fibers. Its softening point was 180° C. as determined on a heated block. It was molded at 205° C. to a film which could be cold drawn 360%.

The present polymers are conveniently prepared in an open reactor equipped with a reflux condenser which permits the by-products of the condensation reaction to escape but not the reactants or the solvent if one is used. During the latter stages of the reaction, it is often desirable to decrease the pressure in order to complete the reaction, and, if desired, to distill off solvent if one is used. However, the polymers can also be removed from the solvent by precipitation methods. Solvents particularly useful in the preparation of the present polyamides are phenols, cresols, xylenols, hydroxydiphenyls, and the like. Another desirable method for preparing the polymers of this invention consists in sealing the reactants in a tube either evacuated or filled with purified nitrogen, and heating until the "half-made" polymer is obtained, and finishing the polymerization by heating the open tube under vacuum.

Further examples of diamines and derivatives of dibasic carboxylic acids and of amino acids containing acetal groups are:

$H_2N-(CH_2)_3-O-CH_2-O-(CH_2)_3-NH_2$;

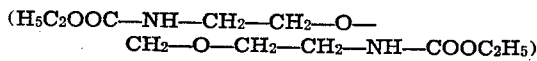

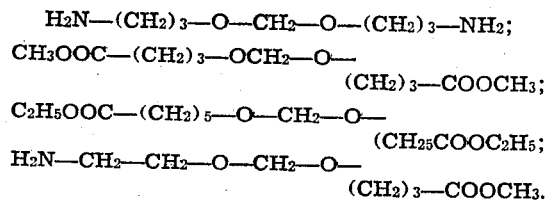

The reactants not containing an acetal group likewise include a large number of compounds comprising the diamines and esters of the dibasic carboxylic acids and amino acids mentioned in the previously cited patents. Typical diamines are tetramethylenediamine, 3-methyl hexamethylenediamine, triglycoldiamine, p-xylylenediamine, and m-phenylenediamine. Examples of suitable dibasic carboxylic acid esters are dibutyl carbonate, diethyl malonate, dimethyl adipate, diethyl pimelate, diphenyl sebacate, and diethyl diphenylolpropanediacetate. Examples of amino acid esters are ethyl 6-aminocaproate and ethyl 12-aminostearate. The reactants above mentioned may contain such heteroatoms as oxygen, sulfur, and tertiary nitrogen in the chain separating the amide-forming groups.

It will be apparent that a large number of combinations of polyamide-forming reactants can be used in the process of this invention. Thus in making polyamides of the diamine-dibasic acid type, more than a single diamine and/or dibasic acid ester may be used so long as one of the reactants contains an acetal group of the type already described. Similarly polyamides can be prepared from a mixture of amino acid esters or from a mixture of diamine, dibasic acid ester, and amino acid ester providing one of the reactants contains an acetal group. It is also within the scope of this invention to employ a small amount of monofunctional reactant, e. g. a monobasic carboxylic acid ester or a monoamine, in the preparation of the polyamides, or to employ a small amount of reactant higher than bifunctional, e. g. a triamine or tribasic acid ester. The use of a large amount of tri- or higher functional reactant (over 10%) generally leads to the formation of an insoluble polymer.

The linear polyamides of this invention include also polymers obtained by admixture of other linear polymer-forming reactants, as for instance esters of monohydroxymonocarboxylic acids and glycol-dibasic acid ester mixtures in the case of polyester-amides, with the polyamide-forming reactants. Both the simple and modified linear polymers of this invention contain as an integral part of the main chain of atoms recurring amide-linkages which are separated by radicals containing an aliphatic acetal linkage. Ester or other linkages (exclusive of carbon-carbon linkages) are preferably not present in these linear polymers in a ratio to the amide linkages greater than 20:1.

The polyamides of this invention, due to the modifying effect of the aliphatic acetal group, are particularly desirable for some purposes, as for instance in uses requiring good solubility and dyeing characteristics. These polyamides are more soluble than the corresponding polyamides which do not contain an acetal group, being in general soluble in 80:20 ethanol-water mixtures and in methanol-chloroform mixtures. They are also more water sensitive. This is a valuable property in connection with the use of the polymers as fibers in fabrics because it improves the absorption of dye, makes the fabrics easier to iron, and enables them to absorb more perspiration. The polyamides of this invention absorb more moisture than do those of comparable composition containing an aromatically attached acetal group. Other useful products obtained from the present polymers include films, bristles, adhesives, coating compositions, and molding compositions. In these and other uses the polyamides may be admixed with plasticizers, oils, resins, other polyamides, pigments, antioxidants, dyes, cellulose derivatives, and other modifying agents.

As many apparently widely different embodiments of this invention may be made without departing from the spirit and scope thereof, it is to be understood that I do not limit myself to the specific embodiments thereof except as defined in the appended claims.

I claim:

1. A process for preparing linear polyamides which comprises heating at reaction temperature bifunctional reacting material comprising molecules containing two amide-forming groups, each of which is complementary to an amide-forming group in other molecules in said reacting material, said amide-forming groups being selected from the class consisting of ester groups and hydrogen bearing amino groups, at least one reactant in said reacting material containing an aliphatically attached acetal group which is an integral linear part of the chain of atoms separating the amide-forming groups, said reactant containing only aliphatically linked carbon atoms in said chain of atoms and continuing the heating until the product can be formed into fibers.

2. A process for preparing linear polyamides which comprises heating at reaction temperature bifunctional reacting material comprising a mixture of diamine having hydrogen bearing amino groups and dibasic carboxylic acid ester of the formula

ROOCCH$_2$OCH$_2$OCH$_2$COOR in which R is a monovalent aliphatic hydrocarbon radical.

3. A process for preparing linear polyamides which comprises heating at reaction temperature bifunctional reacting material comprising a mixture of dibasic carboxylic acid ester and a diamine of the formula

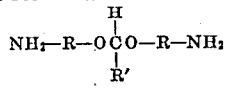

in which R is a divalent hydrocarbon radical in which the carbon atom united to oxygen is aliphatic and R' is a member of the group consisting of hydrogen and monovalent hydrocarbon radicals.

4. A process for preparing linear polyamides which comprises heating at reaction temperature bifunctional reacting material comprising a monoaminomonocarboxylic acid ester of the formula

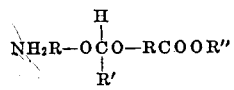

in which R is a divalent hydrocarbon radical in which the carbon atom united to oxygen is aliphatic, R' is a member of the group consisting of hydrogen and monovalent hydrocarbon radicals, and R'' is a monovalent aliphatic hydrocarbon radical.

5. A process for preparing linear polyamides which comprises heating at reaction temperature bifunctional reacting material comprising a mixture of diamine having hydrogen bearing amino groups and dibasic carboxylic acid ester of the formula

C$_4$H$_9$OOC.CH$_2$—OCH$_2$O—CH$_2$COOC$_4$H$_9$ in which both of the C$_4$H$_9$ groups are isobutyl radicals.

6. A fiber-forming linear polyamide consisting essentially of the reaction product of the bifunctional reacting material defined in claim 1.

7. A fiber-forming linear polyamide consisting essentially of the reaction product of the bifunctional reacting material defined in claim 2.

8. A fiber-forming linear polyamide consisting essentially of the reaction product of the bifunctional reacting material defined in claim 3.

9. A fiber-forming linear polyamide consisting essentially of the reaction product of the bifunctional reacting material defined in claim 4.

10. A fiber-forming linear polyamide consisting essentially of the reaction product of the bifunctional reacting material defined in claim 5.

DONALD J. LODER.